United States Patent [19]

Gramm

[11] 4,358,137
[45] Nov. 9, 1982

[54] CARRIER FOR SKI EQUIPMENT

[76] Inventor: Raymond J. Gramm, 2901 Brentwood Ave., Pittsburgh, Pa. 15227

[21] Appl. No.: 165,950

[22] Filed: Jul. 3, 1980

[51] Int. Cl.³ .......................... A63C 11/02; B62B 1/20
[52] U.S. Cl. .................................. 280/814; 150/52 R; 224/917; 280/47.13 R; 294/147
[58] Field of Search .......... 280/814, DIG. 6, 47.13 R; 224/917; 294/147; 211/605 K; 150/52 R

[56] References Cited

U.S. PATENT DOCUMENTS

| | | | |
|---|---|---|---|
| 3,909,031 | 9/1975 | Schmaedeke et al. | 280/814 |
| 4,114,915 | 9/1978 | Lello et al. | 280/814 |
| 4,131,289 | 12/1978 | Maller | 280/814 |

FOREIGN PATENT DOCUMENTS

| | | | |
|---|---|---|---|
| 418201 | 2/1967 | Switzerland | 280/814 |
| 451775 | 5/1968 | Switzerland | 280/814 |

*Primary Examiner*—Joseph F. Peters, Jr.
*Assistant Examiner*—Milton L. Smith
*Attorney, Agent, or Firm*—Robert D. Yeager; Andrew J. Cornelius

[57] ABSTRACT

A carrier for ski equipment that enables a skier to transport skis, ski boots and ski poles all at once to and from the ski slopes. The carrier can be collapsed for storage. The carrier includes a base for supporting the ski equipment, an enclosure having a sealable opening for enveloping and protecting the ski equipment, a base support with transporting apparatus, such as wheels, attached thereto and grips to facilitate handling of the carrier. Further, the base includes apparatus for fixing one end each of a pair of skis within the enclosure.

8 Claims, 11 Drawing Figures

CARRIER FOR SKI EQUIPMENT

BACKGROUND OF THE INVENTION

1. Field of the Invention

This invention relates generally to carriers for ski equipment and, more particularly, to a collapsible carrier for transporting and protecting skis, ski poles and ski boots.

2. Description of the Prior Art

Ski equipment, and in particular skis, ski poles and ski boots, is relatively heavy and quite cumbersome. Accordingly, snow skiers encounter considerable difficulty while transporting their equipment to and from the ski slopes. Such difficulty is aggravated by the relatively large distances, such as between most parking lots and hotel rooms and the slopes, over which the skiers must carry their equipment. A skier, in most situations, is faced with the unfortunate choice of carrying all the equipment at one time to or from the slopes or making several trips.

As a result, workers in the art have designed ski carriers to overcome the above-identified problem. Such carriers allow the skier to more conveniently carry all the equipment at once to or from the slopes. Examples of such carriers can be found in U.S. Pat. Nos. 4,114,915 (hereinafter "'915") and 4,131,289. However, the carrier disclosed in No. '915 illustrates a further problem. The skier must dispose of the carrier when the skier reaches the slopes. Although the elongated member of the '915 carrier telescopes, that carrier will not fit in the lockers available to skiers at the slopes of typical ski areas. When using carriers that will not fit in such lockers, the skier must leave the carrier unattended at the slope area, thereby exposing it to the weather and thieves.

SUMMARY OF THE INVENTION

The carrier disclosed herein enables a skier to easily transport skis, ski poles and ski boots all at once to and from the ski slopes. Further, the skier can collapse the carrier upon removal of the ski equipment therefrom to enable the skier to store the carrier in the lockers available to skiers at the slopes of typical ski areas.

The present invention includes a base for supporting the equipment, a flexible enclosure with a closable opening for enveloping and protecting the equipment, apparatus attached to the base to enable a skier to transport the carrier along a surface and a handle fixed to the enclosure to facilitate handling of the carrier. The base can be formed of any suitable material such as metal or plastic and can include apparatus fixed thereto for fixing one end each of a pair of skis within the enclosure and a base support for allowing the carrier to stand upright.

The carrier of the present invention is particularly useful for enabling a skier to transport ski equipment to and from a ski slope and for allowing the skier to safely store the carrier upon the skier's arrival at the slope.

BRIEF DESCRIPTION OF THE DRAWINGS

An understanding of the detailed description of the preferred embodiment can be enhanced by referring to the drawing in which.

DETAILED DESCRIPTION OF THE PREFERRED EMBODIMENTS

Figure 1:
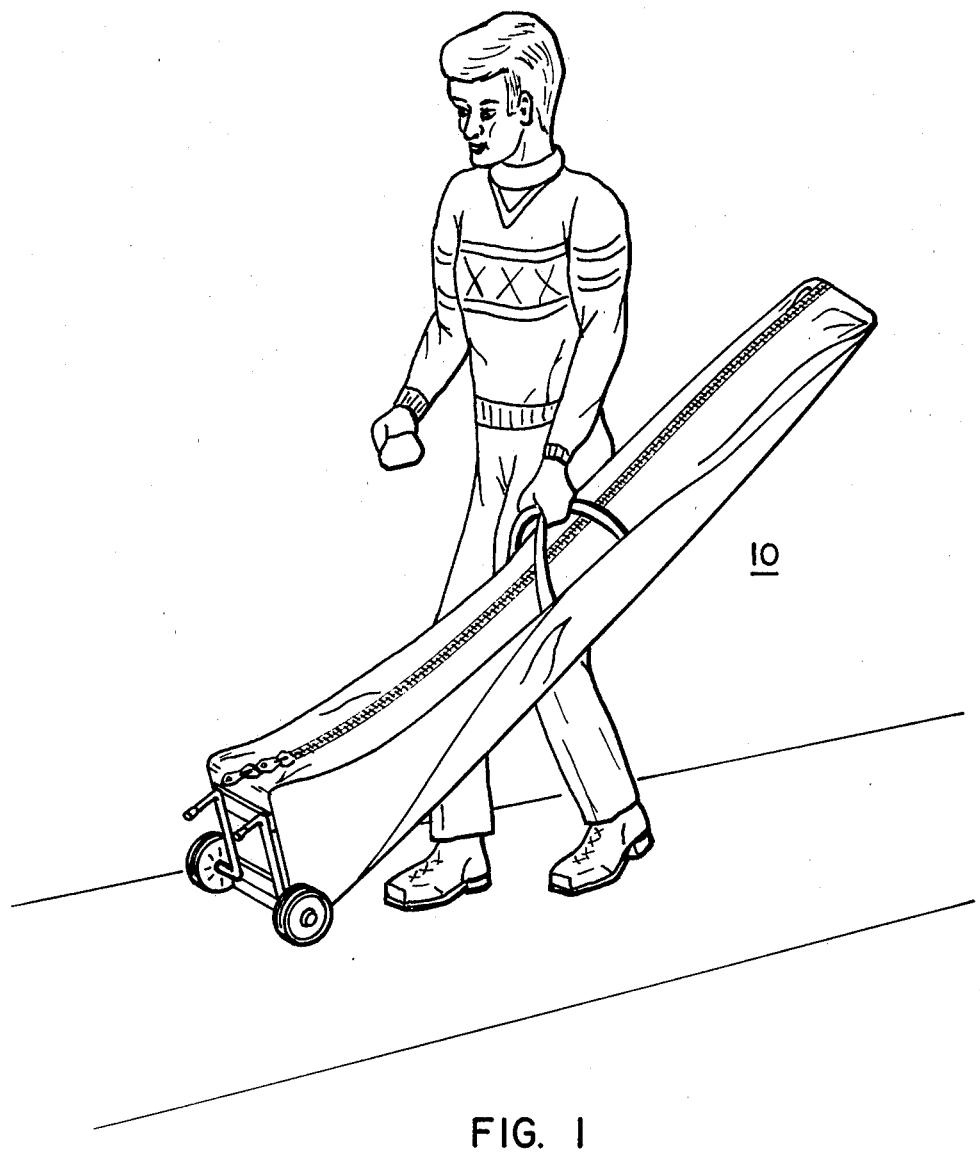
FIG. 1 is an isometric view of a skier transporting ski equipment over a relatively flat surface using a carrier that can be constructed using the provisions of the present invention.

FIGS. 1 through 8 show the basic components of the preferred embodiment of the present invention. Base 12, which supports the ski equipment 38 and the carrier 10, includes flat member 15 and base support 14. Base 12 can be formed from any suitable material, such as metal or plastic. Base support 14 includes support cross members 20, support side members 22, transport support members 24 (see FIG. 5) and support vertical members 26. Side members 22, transport support members 24 and vertical members 26 can be formed from a single piece of suitable material, such as a length of pipe, or can be separate pieces formed of a suitable material and joined together in any suitable fashion. Base support 14 can be fixed to flat member 15 in any suitable fashion, such as by fixing cross members 20 to flat member 15 with screws 16,116 and nuts 18,118. Protectors 56 can be fixed to the ends of members 26.

Enclosure 28, which envelopes and protects the ski equipment 38, can be fixed to base 12 by placing the bottom portion 30 of enclosure 28 between flat member 15 and base support 14 and then fixing flat member 15 to base support 14 with screws 16,116 and nuts 18,118.

The means for transporting carrier 10 along a surface is preferably wheels 32. Wheels 32 can be of any suitable type and can be operatively fixed to transport supports 24 in any known fashion.

Enclosure 28 includes an opening 34 to permit a skier to insert ski equipment within enclosure 28. Enclosure 28 can include means such as a zipper 36, for impermanently sealing opening 34. Handles 46 can be fixed to enclosure 28 to facilitate handling of carrier 10. Base 12 can include ski support member 48 fixed to flat member 15 for fixing one end each of a pair of skis 40 within enclosure 28. Ski support 48 can be fixed to flat member 15 in any known fashion. Ski support 48 has formed therein an opening 54 for receiving one end each of skis 40. Opening 54 can be lined with padding 50 to protect skis 40. Ski support 48 can be formed from any suitable material, such as plastic or sheet metal and padding 50 can be any known rubber material. Angle member 52 may be fixed to flat member 15, ski support 48 and base support 14 by screws 16 and nuts 18 to provide additional support for ski support 48 and enclosure 28.

Figure 3:
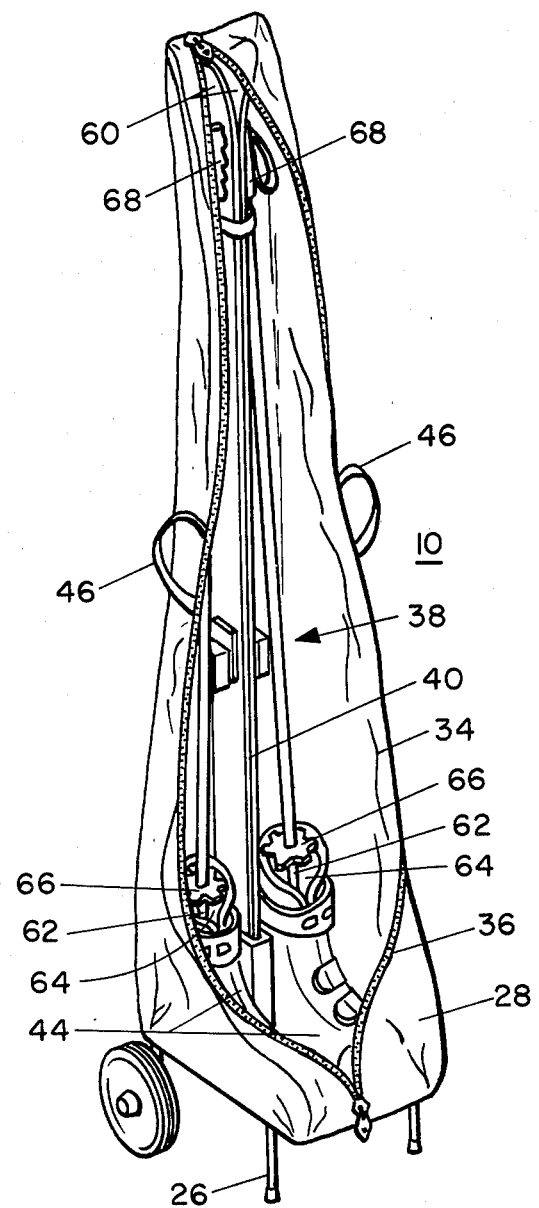
FIG. 3 is an isometric view of the carrier shown in FIG. 1 resting in the upright position with the enclosure open.
Figure 4:
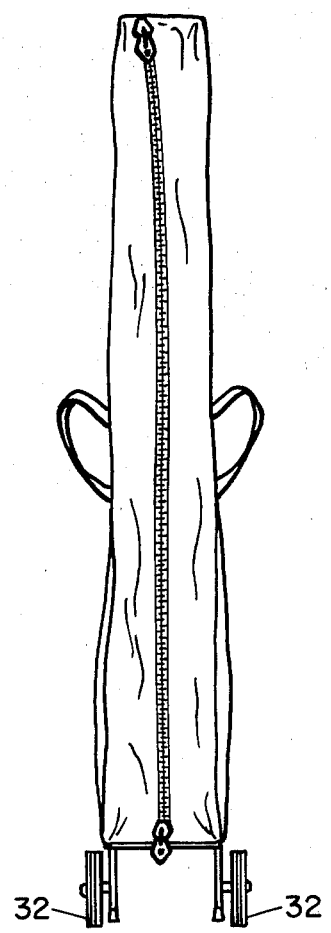
FIG. 4 is a front elevational view of the carrier shown in FIG. 1.
Figure 5:
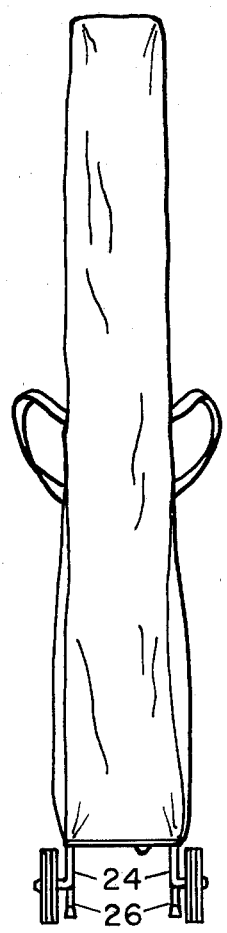
FIG. 5 is a rear elevational view of the carrier shown in FIG. 1.
Figure 11:
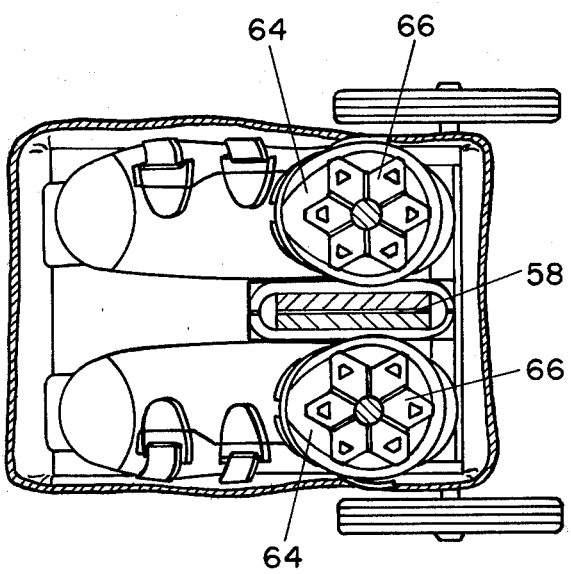
FIG. 11 is a top sectional view of the carrier shown in FIG. 4.

The use of carrier 10 can be understood best by referring to FIGS. 3, 4, 6, 7 and 11. To load ski equipment 38 onto carrier 10, the user should open zipper 36 and place ski boots 44 on flat member 15 within enclosure 28 as shown in FIGS. 3 and 11. Then, the user should place together the bottom surfaces of skis 40, insert the tips of ends 58 of skis 40 into opening 54 of ski support 48 and place tips 60 of skis 40 within enclosure 28 as shown in FIGS. 3 and 11. The user should insert pole tips 62 into boot openings 64 so that pole baskets 66 rest on the tops of boots 44 and insert pole handles 68 into enclosure 28, one pole handle 68 on each side of skis 40. Finally, opening 34 of enclosure 28 can be sealed by closing zipper 36.

Figure 6:
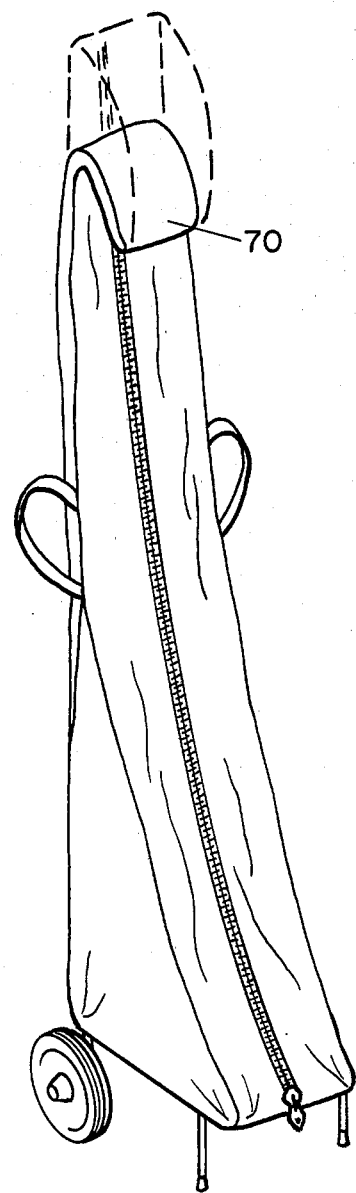
FIG. 6 is an isometric view of the carrier shown in FIG. 1 in the process of being collapsed for storage.
Figure 7:
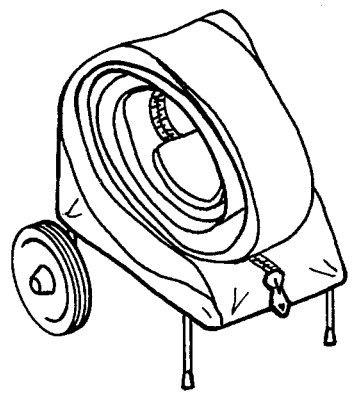
FIG. 7 is an isometric view of the carrier shown in FIG. 6 completely collapsed for storage.
Figure 8:
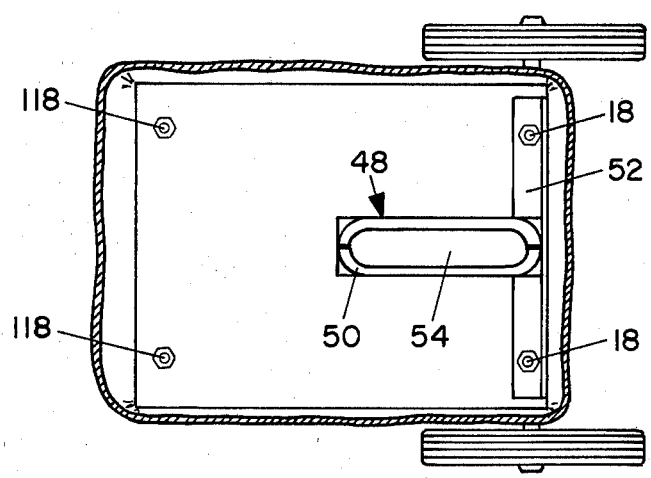
FIG. 8 is a top plan view of the base and transporting apparatus of a carrier constructed according to the provisions of the present invention.
Figure 9:
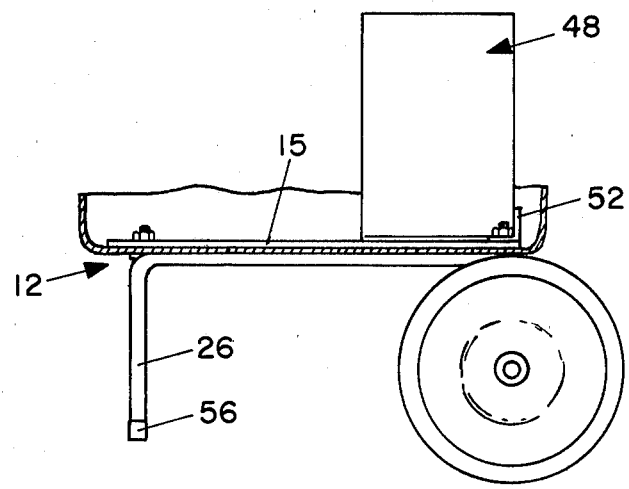
FIG. 9 is a side elevational view of the apparatus of FIG. 8 showing the manner of attachment of the base to the enclosure.
Figure 10:
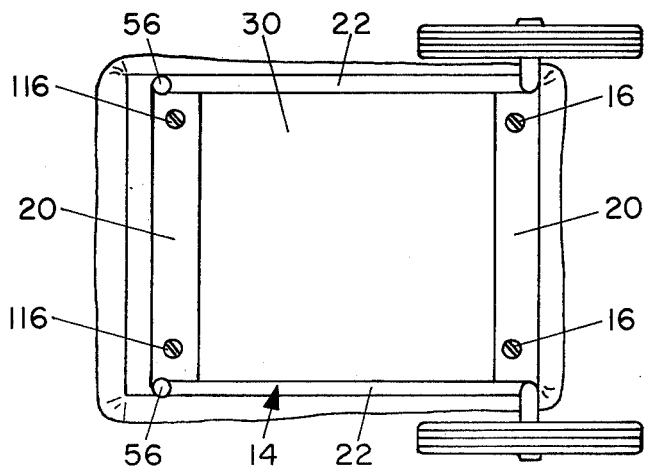
FIG. 10 is a bottom plan view of the apparatus shown in FIG. 8.

To unload and store carrier 10, the user should unload ski equipment 38 from carrier 10 following in reverse the procedure set forth in the immediately preceding paragraph. After equipment 38 has been unloaded, the user can begin collapsing carrier 10 for storage by folding down end 70 of enclosure 28 as shown in FIG. 6. Then the user can fold or roll enclosure 28 to form the configuration shown in FIG. 7.

Figure 2:
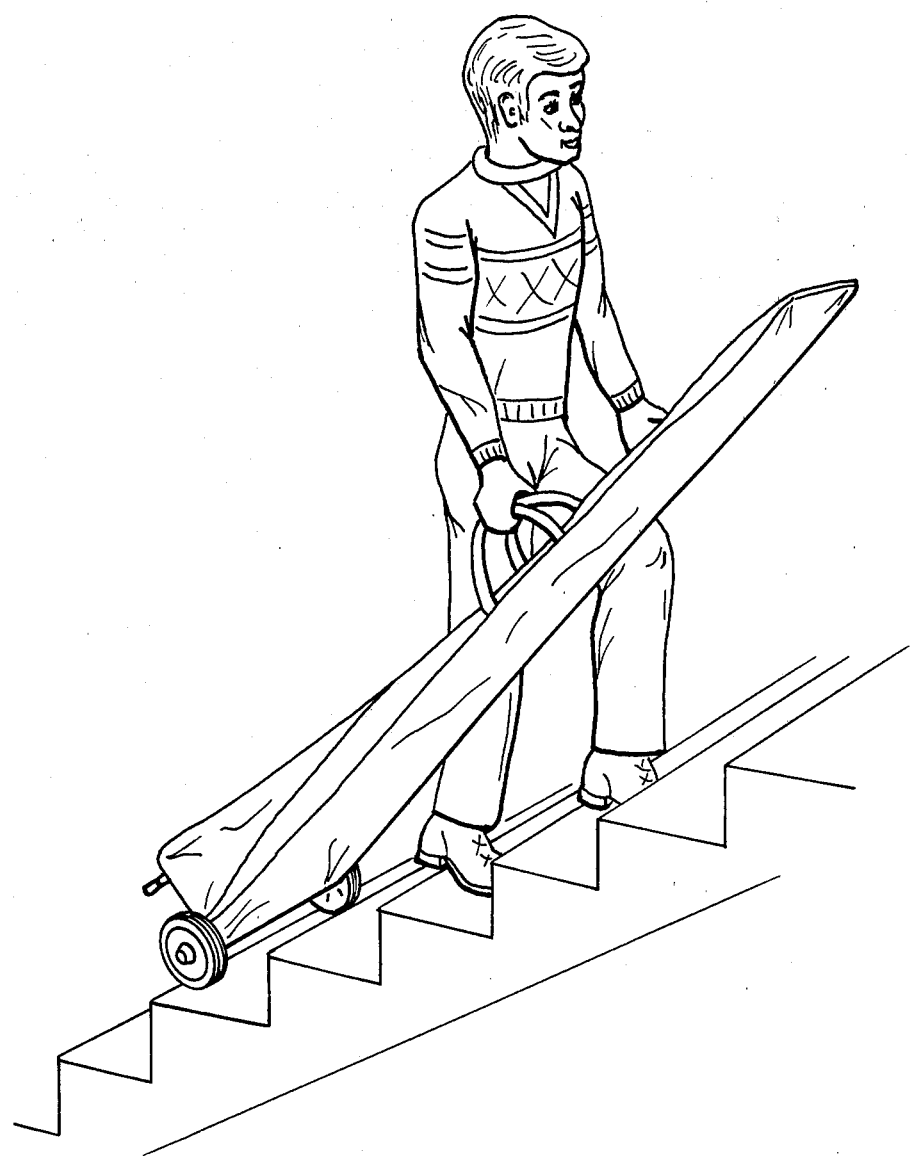
FIG. 2 is an isometric view of a skier transporting skier equipment up steps using the carrier shown in FIG. 1.

When equipment 38 is loaded into carrier 10, carrier 10 can be transported as shown in FIGS. 1 and 2. When it is desired to transport carrier 10 over a relatively smooth surface or down stairs, carrier 10 can be held by grips 46 with base support 14 leading. When it is desired to transport carrier 10 up stairs, carrier 10 can be oriented as shown in FIG. 2 with base support 14 trailing.

What is claimed is:

1. A carrier for transporting and protecting ski equipment comprising:
   a base for supporting said equipment and fixing the position of said equipment relative to said carrier;
   a flexible enclosure fixed to said base for enveloping and protecting said equipment, said enclosure having formed therein an opening so that said equipment can be placed within said enclosure;
   closure means fixed to said enclosure so that said opening can be impermanently sealed;
   transporting means fixed to said base for allowing said carrier to be moved along a surface;
   grasping means attached to said enclosure for allowing the user to pull or push said carrier along said surface;
   whereby said ski equipment can be transported and protected by said carrier and said enclosure can be folded or rolled up to collapse said carrier for storage.

2. The carrier claimed in claim 1 wherein said base includes:
   a base support for allowing said carrier to position a pair of skis in a substantially upright position and to which said transporting means is fixed; and,
   ski support means fixed to said base for impermanently fixing the position of one end each of a pair of skis within said enclosure.

3. The carrier claimed in claim 2 wherein:
   said base is substantially rigid and,
   said ski support means comprises:
      a ski support member fixed to said base having an opening formed therein for receiving said ski ends; and,
      a rubber insert lining said opening of said support member.

4. The carrier claimed in claim 3 wherein said ski support means further comprises an angle member fixed to the rear of said base for strengthening said ski support member and said enclosure at the point of connection of said enclosure to said base.

5. The carrier claimed in claim 4 wherein said base support includes at least one member extending downwardly from said base.

6. The carrier claimed in claim 1 wherein said transporting means is a wheel.

7. The carrier claimed in claim 1 wherein said closure means is a zipper.

8. Apparatus for transporting and protecting skis and ski boots comprising:
   a base capable of supporting a pair of ski boots and supporting a pair of skis in a substantially upright position,
   a flexible member secured to said base adapted to cooperate with said base to enclose the skis and ski boots, and further adapted to be manipulated into a configuration that is more compact than the configuration of said member during normal use of said apparatus when it is desired to store said apparatus;
   means secured to said base for permitting transportation of said apparatus along a surface;
   means secured to said apparatus for transferring force to and moving said apparatus; and
   means for selectively providing access to the enclosure defined by said base and said flexible member to permit the skis and ski boots to be positioned within said enclosure.

* * * * *